May 13, 1969 E. C. RANEY 3,443,751
CONTROL VALVE FOR HEATING AND COOLING SYSTEMS
Filed March 31, 1967 Sheet 1 of 3

INVENTOR
ESTEL C. RANEY

BY Yount, Raney, Flynn and Tarolli

ATTORNEYS

INVENTOR
ESTEL C. RANEY

BY Yount, Raney, Flynn and Jarolli
ATTORNEYS

May 13, 1969 E. C. RANEY 3,443,751
CONTROL VALVE FOR HEATING AND COOLING SYSTEMS
Filed March 31, 1967

INVENTOR
ESTEL C. RANEY

BY
ATTORNEYS

United States Patent Office 3,443,751
Patented May 13, 1969

3,443,751
CONTROL VALVE FOR HEATING AND
COOLING SYSTEMS
Estel C. Raney, Fort Lauderdale, Fla., assignor to Ranco
Incorporated, Franklin, Ohio, a corporation of Ohio
Filed Mar. 31, 1967, Ser. No. 627,458
Int. Cl. G05d 23/12; F28f 27/00
U.S. Cl. 236—1                                  8 Claims

ABSTRACT OF THE DISCLOSURE

A heat exchanger 11 of a heating and cooling system is shown through which heated and cooled liquid is circulated to temper the air in a room. The flow of liquid is controlled by a thermostatic valve 16 comprised of a valve body having a chamber therein, provided with an inlet passage 23 and first and second outlet passages 48, 83, the inlet passage being connected with a liquid source, the first outlet passage being connected with the heat exchanger and the second outlet passage being connected with said source of liquid for bypassing the liquid about the exchanger. First and second valve seats 48, 61 are provided in the respective outlet passages and are closable by two valve closure members 62, 63 downstream of the respective valve seats. The closure members are moved to and from their respective seats by a stem 64 interconnecting the valve members and the valves are spaced apart to cause one valve member to move from its seat as the other valve member is moved toward its seat and vice versa, so that more or less liquid can be directed to the exchanger while the remainder of the liquid bypasses the exchanger. A movable wall means 73 extends transversely of the outlet passage 83 downstream from the valve seat 61 and is connected with the valve closure members whereby fluid pressure differential on opposite sides of the wall urges the wall in a direction to tend to close the valve member 62 on valve seat 48. The wall 73 has openings 80 therethrough for passing liquid flowing through seat 61 to bypass the exchanger. This arrangement substantially balances the pressures on the valve members 62, 63 so that they may be shifted with but slight force.

The valve stem 64 is shifted by a hydraulic thermostatic element 115 through levers 134, 91. The element 115 comprises a chamber 124 having a movable wall 125 and an actuating member 132 moved by the wall. The chamber contains liquid adapted to change in volume and move the wall and actuating member in accordance with changes in the liquid volume contained in a bulb 17 and connected with the chamber 124 by a tube 135. The volume of the liquid in chamber 124 can be adjustably varied to change the temperature at which the member 132 is moved by an adjusting device 20 comprised of a second liquid chamber 144 having a movable wall 145 and a member 157 which is adapted to shift the second wall. The chamber 144 is connected with the chamber 124 by a flexible tube 142 and the chamber and tube are filled with a common liquid. The member 157 is adapted to be slidingly guided in a sleeve 151 for movement against the wall 145. The member 157 is pivotally attached to a manually positionable lever 284 on a frame 141 and the chamber 144 is adapted to be detachably supported on a bracket 163 by sliding a part thereof into a slot in the bracket whereby the chamber can be readily assembled with or removed from the operating member 157.

The present invention relates to temperature control apparatus for air tempering systems for rooms and the like.

It is the practice to heat or cool rooms in a building or the like by providing in each room a fluid heat exchanger which is in heat exchange relation with the air of the room, and which exchangers are supplied with hot or cold liquid from a conduit system extending throughout the building, and having either heated or cooled liquid circulating therethrough. The circulating liquid is diverted from the conduit system and directed through the individual heat exchangers by thermostatic valve mechanisms responsive to the temperatures of the air in the respective rooms according to the heating or cooling requirements of the individual rooms whereby the air tempering of each room is individually regulated to maintain the temperature desired.

A principal object of the present invention is the provision of a new and improved thermostatic valve mechanism which accurately controls the flow of fluid through a heat exchanger in a system of the type mentioned to maintain a desired temperature in the room, is reliable in operation and which can be relatively easily installed to provide a convenient manual adjustment of the temperatures to be maintained by the valve mechanism.

More particularly, an object of the invention is the provision of a new and improved control valve mechanism of the type mentioned having poppet valve members movable by a thermally responsive power element to divert more or less of the liquid from the conduit system through a heat exchanger according to the heating or cooling requirements of the room being tempered by the exchanger and to return the remaining liquid to the liquid conduit system, the valve structure being so arranged that the liquid flow in one part of the valve acts on a movable wall or diaphragm to counterbalance the pressures of the liquid in another portion of the valve whereby the thermally responsive element is not appreciably affected by pressures of the liquid flowing from the conduit system through the valve mechanism.

A further object of the invention is the provision of a thermostatic valve of the character mentioned comprising a valve body including a chamber having an inlet and two outlets, the outlets being controlled by interconnected poppet type valve members alternatively movable to and from valve ports in the outlets to decrease the flow through one outlet while correspondingly increasing the flow through the other outlet, and vice versa, a movable wall being disposed transversely of one of the outlets downstream from the valve member associated with the outlet and connected to the latter valve member and being subjected to differential in pressures on opposite sides of the wall, and liquid bypass means associated therewith so that the liquid pressure differential acting on the wall tends to counterbalance the liquid pressure on the other valve member, and a thermostatic element connected with the valve members and adapted to shift the same according to temperature changes in the room to be tempered.

It has been the practice heretofore to provide temperature control mechanisms, such as valves, comprising a hydraulically expansible power element assembled in the mechanism to operate the same in accordance with temperature changes of an enclosed body of liquid communicating with the interior of the element, and which element is adjustable by a manually manipulated device located remote from the control mechanism and comprising a knob or a handle supported on a frame attached to a convenient structure and accessible to an operator for adjustment. The adjustable device comprises a unit having a variable volume liquid chamber in hydraulic communication with the power element through a flexible conduit, the unit, conduit and power element being integrally joined to provide a hermetically sealed hydraulic system. The installation of control mechanisms of this type in heating or cooling systems has been a problem because of the unitary nature of the power element and its adjusting mechanism and the relatively delicate character of parts thereof. Another important object of the present invention is the provision of an adjustable hydraulic temperature responsive system for operating control mechanisms and the like in which the frame for the adjusting device can be installed while the variable volume unit is detached therefrom and which unit may then be readily attached in operative relation with the frame, with a minimum of manipulation so as to avoid damage or distortion of the adjusting portion of the hydraulic temperature responsive system.

Other objects and advantages of the invention will become apparent from the following description of a preferred embodiment thereof, read in conjunction with the accompanying sheets of drawings forming a part of this specification and in which.

Figure 1:
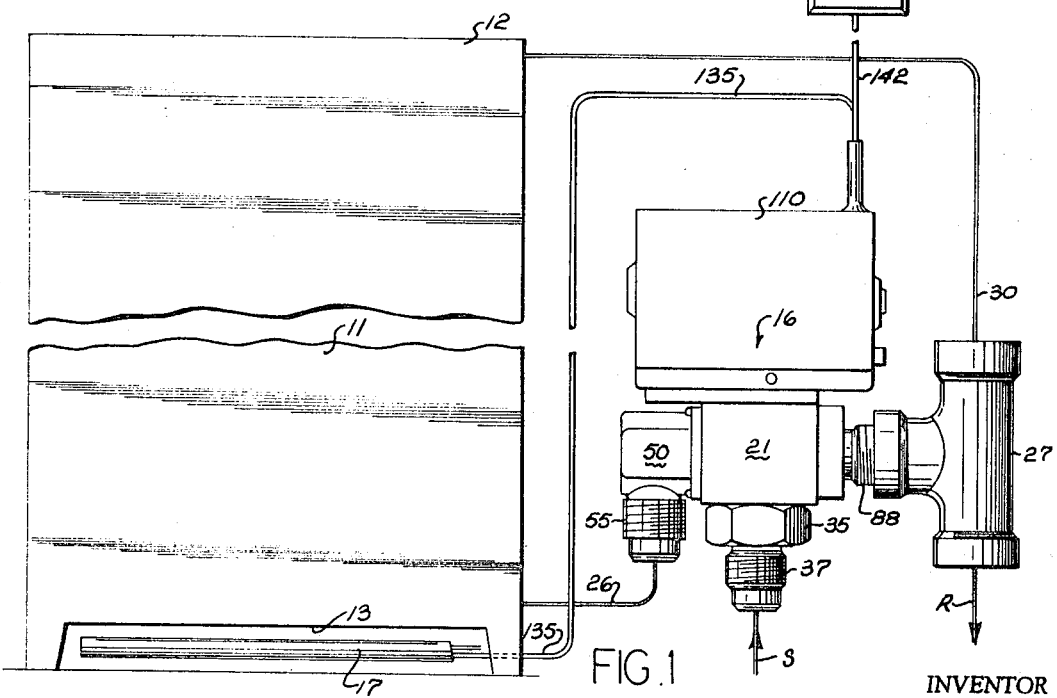
FIG. 1 is a schematic view of a portion of a tempering system for a room, which system includes a thermostatic control valve mechanism embodying the present invention.

Referring to FIG. 1, a portion of an air tempering system is shown for heating and cooling the air in a room or the like, of a building, not shown. The tempering system includes a conventional liquid to air type heat exchanger 11, sometimes referred to as a "fan coil," located at a suitable position relative to the room to effect heat exchange between liquid passed through the fan coil and room air directed thereover by a fan or blower, not shown. The exchanger 11 comprises finned tubing, not shown, enclosed by a housing 12 and through which heated or cooled water flows to heat or cool air drawn from the room by the blower and directed over the tubing. Heat exchangers or fan coils of the type referred to are well known and need not be shown or described in detail for understanding of the invention, except to say that air from the room is drawn into the housing 12 through an opening 13 at the bottom and is discharged into the room through an opening in the top thereof, not shown.

The building in which the fan coil 11 is located may have a number of rooms, each having the air thereof tempered by a fan coil associated therewith. A central water heating and cooling apparatus, not shown, is provided for supplying either heated or cooled water to the fan coils and a conduit system is connected with the apparatus to conduct the water to the fan coils. The conduit system comprises a supply conduit S through which water from the apparatus is pumped throughout the building and a return conduit R which returns water to the apparatus for retempering. The water tempering apparatus is not shown because such are well known. Water is diverted from the supply conduit S and into the fan coil 11 by a thermostatically operated valve mechanism 16 in accordance with the water requirement for tempering the air passing over the fan coil to maintain a desired temperature in the room and the water passed through the fan coil is directed into the return conduit R. The tempered water which is not required by the fan coil 11 is bypassed to the return conduit R by the valve mechanism 16.

The valve mechanism 16 responds to the temperature of the air drawn into the opening 13 by the change in volume of a thermally responsive liquid contained in a bulb 17 located in the opening, as is explained hereinafter, and the temperature maintained in the room by the valve mechanism may be adjusted by a knob 18 of an adjusting device 20 located on a wall, or other suitable support structure which may be relatively remote from the valve mechanism and convenient to the room occupants.

The valve mechanism 16 comprises a valve body 21 having a cylindrical valve chamber 22 therein having an inlet 23 connected with the water supply conduit S, and two alternate outlets 24, 25. The outlet 24 is connected with the inlet 26 of the fan coil 11 and the outlet 25 is connected to the stem of a T coupling 27, one branch of which is coupled with the outlet 30 of the fan coil and the other branch of which is connected with the return conduit R.

Figures 2, 4, 11, 12:
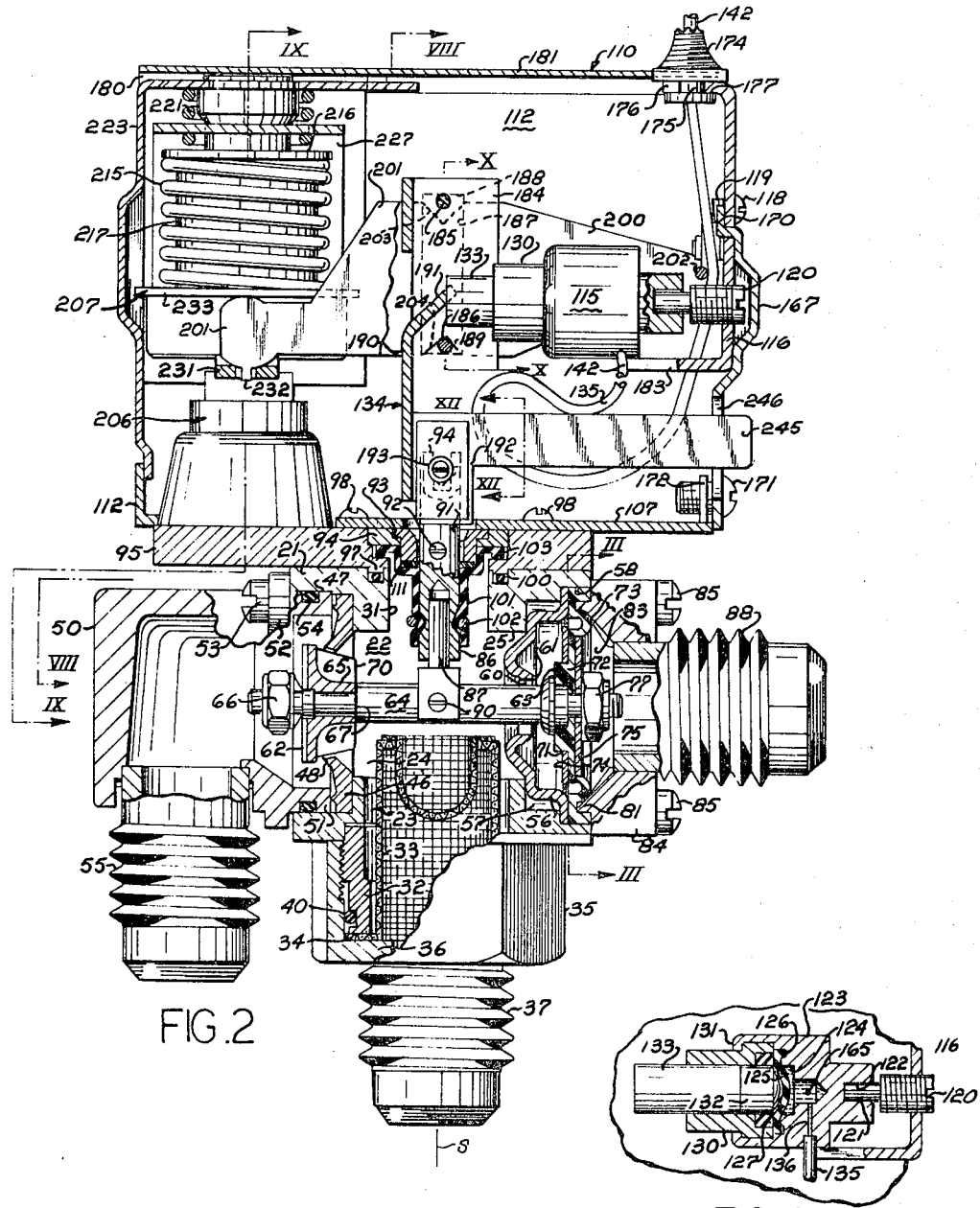
FIG. 2 is a fragmentary view of the valve mechanism shown in FIG. 1 on a larger scale and showing certain parts in section.
FIG. 4 is a fragmentary view partly in section taken substantially along line IV—IV of FIG. 8.
FIG. 11 is a sectional view taken susbtantially along line XI—XI of FIG. 8.
FIG. 12 is a sectional view taken substantially along line XII—XII of FIG. 2.
Figure 8:
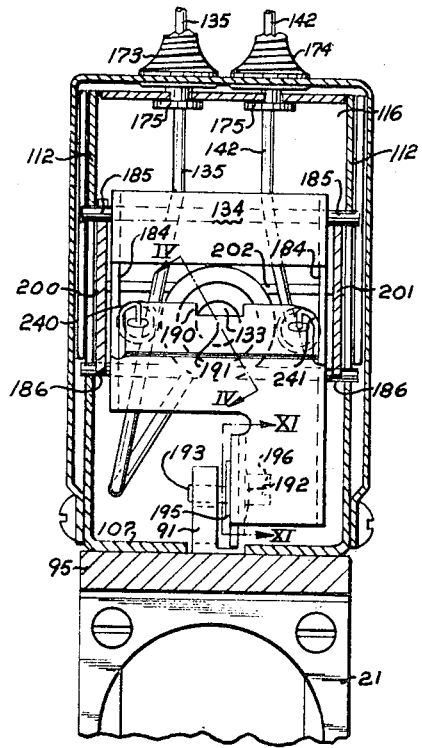
FIG. 8 is a sectional view taken substantially along line VIII—VIII of FIG. 2.

Referring particularly to FIG. 2, the valve mechanism 16 is shown in detail and the valve body 21 comprises a block of metal, such as brass, having a transverse bore which forms the valve chamber 22. A bore 31 intersects the bore 22 to form the inlet 23 and a sleeve 32 is brazed or welded in a counterbore and having its opening aligned with the bore 31. A cylindrical wire screen member 33 is disposed coaxially with the sleeve 32 and its open end has a radial flange 34 which overlies the end edge of the sleeve. The inner end of the screen 33 is closed by a wire mesh wall so that the screen removes all grit and other foreign matter from the water entering the valve chamber 22. The screen 33 is secured in place by a nut 35 threaded on the sleeve 32 and having an inwardly extending flange 36 which engages the outer side of the sleeve flange 34 to clamp the screen to the end of the sleeve.

The nut 35 has a threaded coupling 37 formed integral therewith for connection of the valve inlet with the conduit S. Preferably, a sealing ring 40 is placed in a groove about the sleeve 32 to prevent leakage between the nut 35 and the sleeve.

The outlet structure 24 for the valve chamber 22 comprises an annular valve seat member 46 which is positioned in a counterbore 47 in the left hand end of the body 21, as viewed in FIG. 2, and has a circular ridge-like outwardly facing valve seat 48 formed thereon. The seat member 46 is secured in place by a hollow end member 50 having an annular flange 51 which closely fits in the counterbore 47 and engages the member 46. The end member 50 has a rectangular outwardly extending flange 52 extending thereabout which is attached to the left hand end of the valve body 21 by four screws 53, only one of which appears in the drawings, located adjacent the corners of the flange, and the screws clamp the member 50 to the valve seat member 46 to secure that member in the counterbore 47. A sealing ring 54 is disposed in a groove formed about the annular flange 51 to prevent leakage of water between the walls of the counterbore 47 and the flange. A threaded coupling 55 is brazed or welded in an opening in the end member 50 by which the outlet 24 is connected with the inlet pipe 26 of the fan coil 11 in a conventional manner, not shown.

The structure at the outlet 25 comprises a dish-shaped valve seat member 56 which is received in cylindrical recesses 57, 58 formed about the right hand end of the bore 22, and the seat member has a central opening 60 formed therethrough. The portion of the member 56 about the opening 60 is tapered outwardly relative to the chamber or bore 22 and forms a valve seat 61.

The valve seats 48 and 61 are adapted to be alternatively closed by poppet type valve members 62, 63, which are carried on a stem 64, the opposite ends of which extend through the openings or ports through the valve seats. The valve member 62 comprises a molded elastomer disc-like member having a neck 65 through which a reduced portion of the stem 64 projects and is secured to the stem by a nut 66 threaded on the stem and which positions the valve member on the stem. The valve member 62 has four vanes or webs 70 formed thereon, only two of which appear in the drawings, the outer edges of which rest on the edges of the opening through the valve seat and guide the stem 64 coaxially of the seat while permitting liquid to flow therebetween when the valve member 62 is removed from the seat 48.

The valve member 63 is formed by a central portion of a diaphragm 71 seated against a flared portion of the stem 64 and the stem adjacent that portion is supported in axial alignment with the valve seat 61 by the circular diaphragm 71 having a central, necked opening 72 through which the right hand end portion of the stem extends. The diaphragm 71 is formed of a suitable resilient, water impervious material and has an annular corrugation 73 formed thereabout so that the diaphragm readily flexes in an axial direction relative to the stem 64. The inner portion of the diaphragm 71 is reinforced by two washers, 74, 75, which surround the neck 72 and which are secured together with the diaphragm sandwiched therebetween by two rivets 76. The diaphragm 71 and the washers 74, 75, assembled thereto are attached to the stem 64 by a nut 77 threaded on the stem and which presses the diaphragm to the annular shoulder formed by the enlarged portion of the stem, as shown.

The diaphragm 71 and the washers 74, 75 have five openings 80 formed therethrough, the combined areas of which openings are substantially less, in the order of one-half, than the area of the opening through valve seat 61, less the cross-sectional area of the stem 64, so that although water flowing through the valve seat 61 may pass through the opening through the diaphragm, a pressure differential is created on opposite sides of the diaphragm and causes the latter to urge the stem 64 to the right when the seat 61 is relatively wide open. This tendency of the diaphragm 71 to move the stem 64 to the right, counterbalances the water pressure on the inner surface of valve member 62 tending to move the valve member from its seat 48 when this valve member is closed on the seat. It will be seen that the area of the diaphragm 71 exposed to the water flowing through the seat 61 is somewhat greater than the area of the valve member 62 exposed to the opening through the valve seat 48. By reason of this counterbalancing effect, the force required to shift the valve stem 64 axially is relatively slight so that a thermally responsive power element may effect this movement accurately according to temperature changes, as is described hereinafter.

The peripheral edges of the diaphragm 71 have an annular outwardly facing groove formed therein which receives an annular ridge 81 formed about an opening 83 through a rectangular end plate 84 which is secured to the body 21 by four corner located screws 85, only two of which appear in the drawings. The edges of the diaphragm 71 form a sealing gasket between the adjacent surfaces of the end plate 84 and the body 21 and the plate 84 has a threaded connector sleeve 88 integral therewith by which the valve is connected with the T 27.

From the foregoing it is apparent that the diaphragm 71 forms a movable wall extending transversely of the flow passage downstream of the outlet valve seat 62, and is subjected to the differential in water pressure on opposite sides thereof to tend to urge the stem 64 and the valve member 62 to its seat 48, and that the openings 80 form bypasses for the water through or about the wall to permit the water to flow to the T member 27.

The valve members 62, 63 are spaced apart such that when the valve member 62 engages and closes the seat 48, the valve member 63 is removed from the seat 61 to provide for full flow through this part of the seat, and when the valve member 63 is closed on its seat 61, the valve member 62 is removed from its seat 48 to provide full flow through the latter seat. By this arrangement, all of the water entering the valve body 21 may be made to flow either to the convector 11 or the return conduit R, or a portion of the water may be directed into the convector while the remainder flows to the return conduit.

The valve stem 64 is adapted to be shifted axially to position the valve members 62, 63 in their various flow control positions by an actuator link 86 which comprises a rod 87 having a clevis-like end which straddles the valve stem and is pivotally attached thereto by a pin 90. The rod 87 is slidingly received in a bore of an actuator lever 91 which is pivoted on a pin 92 supported to extend transversely of the opening through a bushing 93 which nests in a washer 94 seated in a counterbore in an end plate 95 attached to the valve body. The end of the lever 91 projects from the valve body and is moved by a thermostatic mechanism, described hereinafter.

The plate 95 is suitably secured to the valve body 21 by screws 98, and has a counterbored opening coaxial with the bore 31 in the body 21 in which the peripheral edge of the washer 94 is received. A ring boss 97 is formed about the opening through the plate 95 and is impressed on a gasket 100 in a circular groove in the face of the valve body by the attachment of the plate 95 to the valve body, thus providing a liquid seal about the mouth of the bore 31.

A rubber sleeve 101 surrounds the lever 91, one end being clamped to the lever by a wire 102, and the opposite end of the sleeve has a radial flange 103, the outer edges of which are clamped to an annular shoulder, formed by one of the counterbores in the plate 95, by the washer 94 which is pressed against the flange by a wall 107 of a casing or frame 110 which houses the thermostatic mechanism. The sleeve 101 has an enlarged diameter portion in which a washer 111 rests and which washer is backed by the bushing 93 supported against the washer by the wall 107. By the construction just described, the link 86 can be oscillated about its pivot 92 to move the valve stem 64 from one extremity of its movement to the other, while providing low resistance to its valve operating movements.

The thermostatic mechanism is supported in the casing 110 which comprises a channel-shape sheet metal member 112, the yoke wall 107 of which is secured to the plate 95 by the screws 98 which also secure the plate to the valve body 21. A thermostatic power element 115 is supported on a cover or base plate 116 attached to the member 112 between the side walls thereof by two screws 118, only one of which is shown, threaded into inwardly turned tabs 119 formed on the frame member 112. The base plate 116 has a screw 120 threaded therein which supports the power element 115 on a neck 121 on the screw which is received in a bore 122 of the body 123 of the power element.

The power element 115 is of a well known liquid fill type and, as best seen in FIG. 4, it comprises the cylindrical body 123 having a cylindrical liquid containing recess 124 closed at one end by a flexible, liquid impervious diaphragm 125 having a beaded edge which is sealingly pressed into an annular groove 126 by a washer 127 to form a movable wall of the recess. The washer 127 is embraced in a counterbore in an enlarged end of a sleeve 130 which is firmly held in the end of the body 123 by rolled over edges 131 of the body. A plug 132 is slidingly received in the sleeve 130 and in the opening through the washer 127, and its inner end, which is semi-spherical in form, engages the diaphragm 125 which is of complementary form. Preferably, the washer 127 and plug 132 are of low coefficient of friction material. A cylindrical plunger 133 is adapted to slide in the sleeve 130, and an actuating lever 134, which is connected with the valve actuating lever 91, bears continuously against the plunger and thereby moves according to the increases and decreases in volume of liquid in the recess 124.

The recess 124 is filled with a liquid which is the type which is part of a body of thermally responsive liquid contained in a hermetically sealed hydraulic system comprising a flexible capillary tube 135 interconnecting the body 123 and the bulb 17. The body 123 has a radial bore 136 leading into the recess 124 and one end of the tube 135 is secured in the bore, as by brazing. It will be seen that as the volume of liquid in the bulb 17 expands and contracts, the volume of liquid in the recess 124 will increase and decrease, because of the hydraulic connection, causing the diaphragm 125 to move outwardly and inwardly and thereby control the position of the actuating lever 134 according to the temperature at the bulb 17.

The volume of the liquid in the recess 124 may also be varied by the temperature adjusting device 20 located in the room convenient for manual adjustment for altering the temperature at which the room is to be maintained. The device 20 includes a liquid volume varying unit 140 which may be manually manipulated by the knob 18 to increase or decrease the volume of liquid in the recess 124 of the power element 115 at any given temperature, and thereby set the power element to operate the actuating lever 134 at selected temperatures to maintain a desired temperature in the room.

Figure 5:
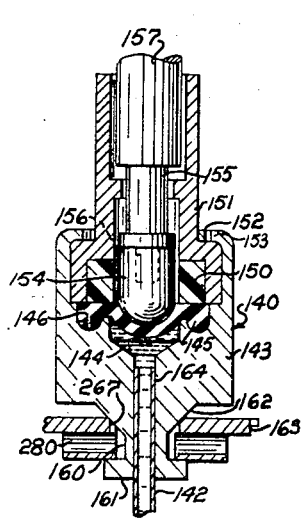
FIG. 5 is a sectional view taken substantially along line V—V of FIG. 7, and on a larger scale.
Figure 6:
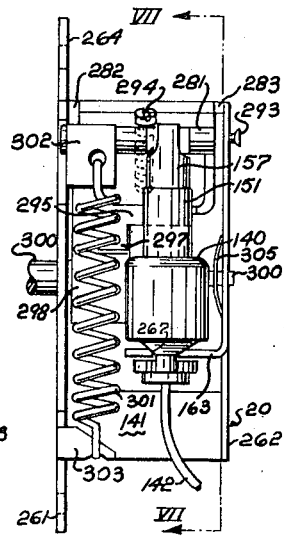
FIG. 6 is a fragmentary side elevational view of a part of the adjusting device for the control valve mechanism.

The adjusting device 20 comprises a frame 141 which is adapted to be suitably attached to a wall of the room and which supports the unit 140 which is hydraulically connected with the recess 124 of the element 115 by a flexible capillary tube 142. The unit 140, which is shown in detail in FIG. 5, is similar to that of the power element 115, including a cylindrical body 143 having a recess 144, one end of which is closed by a diaphragm 145 having a peripheral bead sealingly pressed into an annular groove 146 by a washer 150 and a sleeve 151. The sleeve 151 has an enlarged end portion which is undercut to receive the washer 150, and the shoulder 152 formed by the enlargement is engaged by an end edge 153 of the body 143 rolled over the shoulder to tightly clamp the sleeve to the body. A plug 154 slides in the sleeve 151 and washer 150 and its inner end, which is semi-spherical, engages the diaphragm 145, which has a form complementary to the end of the plug. A connector plug 155 has a reduced diameter end part 156 received in an axial bore of the plug 154 and the opposite end of the connector plug is adapted to be engaged by a plunger 157 which is extended into the open end of sleeve 151 and which engages the outer end of the connector plug 155 and presses the plugs 155 and 154 against the diaphragm 145. The plunger 157 is actuated to move axially of the sleeve in accordance with the setting of the knob 18, as is described hereinafter, and by so moving vary the position of the diaphragm 145 and the volume of the liquid contained by the diaphragm within the recess 144.

The end of the body 143 opposite the end carrying the sleeve 151 has a neck formation 160 and a collar 161 about the neck. Conical shoulders 162 taper to the neck 160 so that the body can be readily assembled on a bracket 163 of the frame 141 in a manner more fully described hereinafter.

One end of the tube 142 extends into a bore 164 through the neck 160 and leading into communication with the interior of the recess 144 and is brazed in the bore. The opposite end of the tube 142 is likewise brazed in a bore 165 extending radially into the recess 124 of the power element 115. Thus, the power element 115, bulb 17 and unit 140, with the inter-connecting tubes 135 and 142, are filled with a body of thermally responsive liquid and form a closed hydraulic thermally responsive system. By positioning the plunger 157 at different axial points in the sleeve 151, the volume of liquid in the chamber 144 is varied. For example, a decrease in volume of liquid results in an increase in volume of liquid in the recess 124 of the power element 115. The walls of the bulb 17 are rigid and its volume of liquid is unchanged by the adjustment of the volume of liquid in the chamber 144. An increase in volume of liquid in recess 124 due to the adjustment of the knob 20, causes the plunger 133 to be moved outwardly of the sleeve 130 by a rise in temperature at the bulb 17 which is lower than the temperature at the bulb required to cause the same movement with a lesser volume of liquid in the recess.

The volume of liquid contained in the power element 115 and the adjusting unit 141 are substantially less than the volume of liquid in the bulb 17 so that changes in temperature of the small volumes of liquid at the element and unit do not appreciably affect operation of the plunger 133. Likewise, the inside diameters of the tubes 135, 142 are small so that the volume of liquid therein does not appreciably affect the temperature response of the power element 115.

It will be evident to those familiar in the art that the temperatures at the bulb 17 at which the power element 115 actuates the lever 134 through a given movement can be varied by turning the screw 120, and this screw adjustment is utilized to calibrate the valve mechanism.

The screw 120 is enclosed by a cover plate 167 which is attached to the base plate 116 by an offset tongue portion 170 inserted in an opening through the base plate and engaging the inner wall of the base plate, and a screw 171, threaded in an opening through a lug 172 formed on the casing member 112.

The tubes 135 and 142 enter the casing 110 through flexible coil wire bushings 173, 174 which prevent destructive bending of the tubes. The wire bushings 173, 174 include neck portions 175 received in notches 176 in a turned end portion 177 of the base plate 116 and are retained in the notches by bending the plate at one side of the notches onto the necks. A U-shaped outer cover member 180, the sides of the member 112 and the end yoke wall 181 thereof has a recessed portion, not shown, which receives the bases of the wire bushings 173, 174. The cover member 180 is secured to the casing member 112 by screws 182.

The tubes 135, 142 are led to the power element 115 along opposite side edges of an inturned tab 183 of the wall 116 and the tubing engaging the edges of the tab prevents rotation of the power element.

Figure 10:
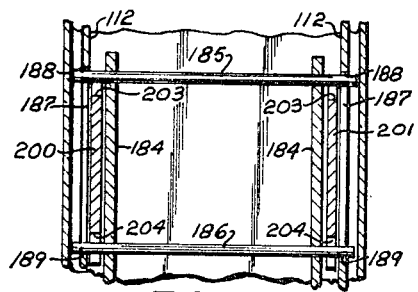
FIG. 10 is a sectional view taken substantially along line X—X of FIG. 2.

The actuating lever 134 is comprised of a sheet metal plate having parallel extending side flanges 184 which support two pins 185, 186 extending between the two flanges and the ends of which project beyond the outer surfaces of the sides to form bearings about which the lever pivots, as is explained hereinafter. The ends of the pins 185, 186 extend into windows 187 formed in the opposite sides of frame member 112 and engage the opposite end walls 188, 189 of the windows respectively which form stops to prevent longitudinal movement of the lever 134 and provide abutments about which the pins may alternatively pivot. The central portion of the lever 134 is cut out to form a ledge 190 from which a laterally extending finger 191 is cut and deformed and the end of which engages the end of plunger 133. One end of the lever 134 has a laterally extending portion 192 which carries a pin 193 extending normal thereto and which engages in a slot 194 in the end of the actuating lever 91. As seen in FIGS. 10, 11, the pin 193 is supported eccentrically on a disc 195 which has an axial pin 196 formed integral therewith and which is rotatably supported in an opening through the part 192 of lever 134. The pin 196 has a slotted head 197 and a flat spring lock washer 198 is interposed between the head and the adjacent surface of part 192 to frictionally maintain the disc 195 to the lever part so that the pin can be adjustably rotated by a tool inserted in the slotted head to effect proper alignment between the actuating lever 134 and the actuating lever 91.

The pins 185, 186 are adapted to form alternative pivots for the lever 134 on one side or the other of the center line of movement of the plunger 133, and this alternate pivoting structure comprises a pair of pivot levers 200, 201 movable in unison and pivoted on a pin 202 supported at its ends in opposite sides of the casing member 112 and each lever having a pair of V notches 203, 204 in opposite edges which receive the pins 185, 186, respectively, to form pivots about which the lever 134 is rocked. The V notches 203, 204 are spaced apart so that only one of the pins 185 or 186 is engaged by the walls of the respective notches at any one time, according to the position of the pivot levers.

The pivot levers 200, 201 are each comprised of a sheet metal strip, one end of which is pivoted to the pin 202 which is supported transversely of the casing member 112 and which strips extend alongside the outer sides of flanges 184 of the lever 134. The unpivoted ends of the levers 200, 201 are adapted to be shifted in unison by a thermostatic device comprising a thermally responsive power element 206 and a spring loading structure 207.

The actuating lever 134 is caused to follow movement of the plunger 133 by two tension springs 240, 241, one of the ends of which are attached to opposite sides of the lever and the other ends of which are attached to lugs on the sides of the casing member 112, to urge the lever to the plunger.

Figure 9:
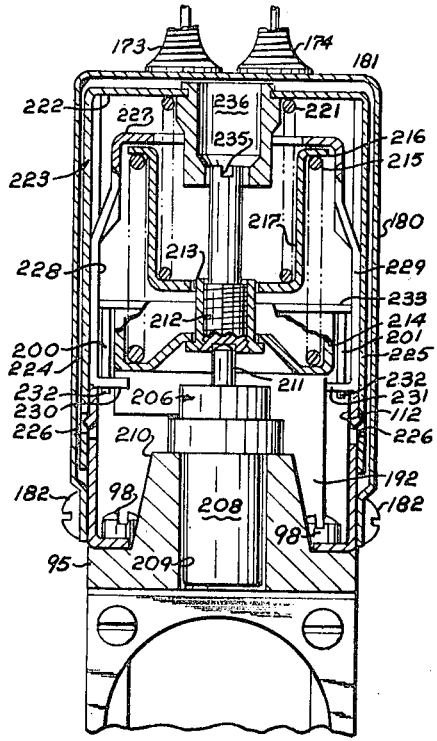
FIG. 9 is a sectional view taken substantially along line IX—IX of FIG. 2.
Figure 13:
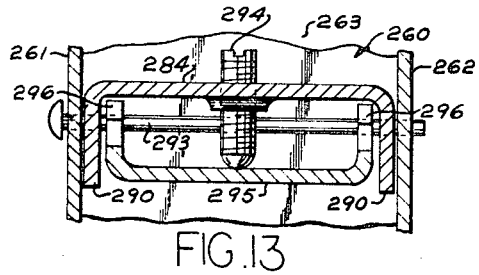
FIG. 13 is a sectional view taken substantially along line XIII—XIII of FIG. 7.
Figure 3:
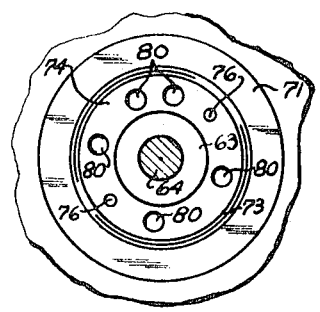
FIG. 3 is a view of a diaphragm member taken substantially along lines III—III of FIG. 2.

Referring to FIG. 9, the thermostatic power element 206 is of a well known construction comprising a metal shell 208 which is received in a cylindrical opening 209 formed in a boss 210 integral with the plate 95 so that the temperature of the walls of the opening 209 will correspond to the temperature of the liquid passing through the valve body 21 by reason of conduction of heat through the metal of the body and plate. The shell 208 contains a suitable thermally responsive material such as wax, which expands when it changes from a more or less solid phase to a liquid phase, which expansion drives a plunger 211 outwardly from the shell, and the plunger recedes into the shell when the material reverts to its solid phase. The plunger 211 is operative through a yieldable overtravel mechanism to shift the levers 200, 201 and change the pivots about which the lever 134 is moved by the power element 115, thereby reversing the response of operation of the valve.

The overtravel mechanism comprises a threaded plug 212 which is threaded into a bushing 213 which extends through an axial opening in the end wall of a cup 214 and which is secured to the cup. A compression spring 215 has one end abutting the end wall of the cup and the other end engages the out-turned flange 216 of a cup 217 which is urged in the direction of cup 214 by a compression spring 221 interposed between the yoke wall 222 of a frame member 223 and the end wall of the cup 217. The bushing 213 extends freely through an axial opening in the end wall of the cup 217 so that the cups 214, 217 can move relative to one another in an axial direction. The compression spring 221 is weaker than the spring 215 and yields under force transmitted thereto from the plunger 211 through the cup 214, spring 215 and cup 217, the purpose of which appears hereinafter.

The member 223 comprises a four-sided sheet metal box-like member having opposite sides 224, 225 which are attached to the side walls of the casing member 112 by lugs 226 formed thereon which catch in openings in the sides of the cover member, as seen in FIG. 9.

The flanges 216 of the cup 217 engage a clamp plate 227 which has two laterally extending parallel arms 228, 229, the ends of which are inturned to form abutments 230, 231. One end edge of each pivot lever 200, 201 engages the respective abutments 230, 231 and the engaging edges have guide tabs 232 which extend through slots in the abutments to position the clamp arms. The edges of the pivot levers 200, 201 opposite the abutments 230, 231 engage a radially extending flange 233 on the cup 214 so that the ends of the pivot levers are resiliently clamped between the abutments 230, 231 and the flange 233. To minimize friction between the engaging parts, the opposite edges of the pivot levers are formed arcuately so that a rolling action occurs between the levers and the abutments and flange surfaces engaged thereby as the levers are swung about the pivot pin 202.

By the construction described, the spring 221 maintains a load on the plunger 211 of the power element 206 through the spring 215 and the cups 214, 217. In the event that the levers 200, 201, moved by expansion of the thermally responsive material in the power element 206 through the plunger 211 reach the extent of their travel by pin 185 engaging the sides of the pair of notches 203, and the plunger 211 continues its travel, the movement of the clamp 225 will be stopped and the spring 215 will then be compressed as the cup 214 is forced by the plunger toward the clamp plate. Thus, overtravel of the plunger 211 is permitted without rupturing or deflecting parts which would otherwise be detrimental to the mechanism.

To calibrate operation of the thermal element 206, the plug 212 has a slotted end stem 235 which extends through an axial opening in a thimble 236 secured in an opening through the end wall 222 of the cover 180, as shown in FIG. 9. By rotating the stem 235 with a suitable tool, the proper relative positions of the plunger 211 and the cup 214 can be established before the cover 180 is installed on the frame 112.

It will be seen that when the arms 200, 201 are in the position shown in FIG. 2, occasioned by cool water affecting the thermal element 208, the actuating lever 134 will pivot about the pin 186 being embraced by the walls of the notches 204 in levers 200, 201, and when hot water flows through the valve, the element 208 will move the arms 200, 201 so that the two notches 203 thereof engage pin 185 and cause the lever 134 to pivot about the latter pin when the power element 115 expands and contracts. Thus, when cold water flow in the tempering system because of warm atmospheric temperatures, expansion of the liquid in the power element 115 due to increase in temperature at the bulb 17 results in the lever 134 being pivoted counterclockwise about the pin 186 which moves the link lever 86 about the pin 92 to shift valve member 62 from its seat 48 and to shift valve member 63 toward its seat 61. This action increases the flow of cold water through the coil 11. Conversely, as the temperature at the bulb 17 decreases, the valve members are moved to throttle or close off the flow of cooling water to the coil 11.

When hot water is flowing through the tempering system, the power element 206 moves arms 200, 201 to engage the edges of the two notches 203 with pin 185 and cause lever 134 to be pivoted clockwise about pin 185 when the temperature at the bulb 17 increases, thereby throttling the flow of hot water to the coil 11. When the temperature at the bulb 17 decreases, the element 115 moves the lever 134 to increase the water flow to the coil.

In the form of the invention shown, a means is provided for manually actuating the actuator lever 134 in the event the power element 115 should lose its liquid fill and become inoperative. The means shown comprises a laterally projecting link arm 245 formed integral with the lever 134 and which projects through an opening 246 in the cover plate 167. In the event that the power element 115 becomes disabled, the link arm 245 may be moved in either direction longitudinally and held in such position by suitable detent means, not shown, to maintain the valve stem 64 in position for providing the desired flow of water through the valve body 21.

When the valve mechanism 16 is fabricated, the tube 142, with the element 115 attached thereto, may be wound in a convenient coil and secured to the valve mechanism for ease of handling during installation of the valve between the conduit system and the coil 11. The frame 141 of the adjusting device 20 may be installed in a wall or other support structure without uncoiling the tube 142 from its proximity with the mechanism 16 so as to minimize the chance of damaging the relatively delicate flexible tubing 142 which is preferably formed of a soft material, such as copper, and which will not withstand repeated flexures. After the frame 141 has been installed, tubing 142 may be uncoiled to extend the unit 140 to the frame and is readily applied thereto with a minimum of manipulation. In accordance with the invention, the frame 141 of the device 20 comprises a generally channel shape frame member 260 having parallel side walls 261, 262, and a yoke wall 263. The wall 261 has mounting tabs 264, 265 formed thereon which have openings for receiving mounting screws, not shown, to secure the device to a suitable support, such as a conventional electrical junction box installed in a wall of the room and which may be several feet distant from the convector 16.

The frame wall 262 has an inwardly turned foot which forms the frame 163, the foot being slotted at 267 for receiving the neck 160 of the unit 140. A bowed leaf spring 280 is secured at one end to the underside of the foot, as viewed in the drawings, by rivets 279, and has a slot at the opposite end, the sides of which register with those of the slot 267. The unit 140 is adapted to be supported on the foot 163 by inserting the neck 160 in the slot 267 with the shoulders 162 engaging the upper edges of the slot and the spring 280 engaging the collar 161 to urge the shoulders to the foot.

Figure 7:
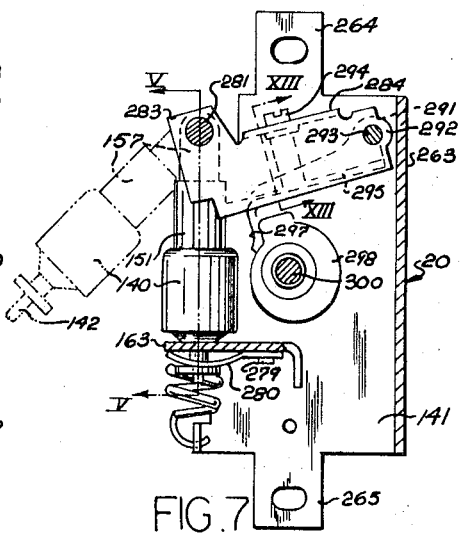
FIG. 7 is a view taken substantially along line VII—VII of FIG. 6.

When the unit 140 is positioned as just described, the plunger 157 is received in the sleeve 151 and one end engages the plunger 155. The other end of the plunger 157 is pivotally supported on a pin 281, the ends of which are supported in spaced arms 282, 283 of a lever 284. The pin 281 has a section of reduced diameter and the end of the plunger 157 is slotted to receive this reduced diameter section of the pin. The portions of the plunger 157 forming the opposite sides of the slot are curved about the pin to retain the plunger on the pin while permitting the plunger to be swung on the pin. Thus, in assembling the unit 140 in the frame 261, the plunger is swung outwardly from the frame, as indicated in broken lines in FIG. 7, and the unit is manipulated to cause the plunger to be received in the sleeve 151, after which the unit is swung into supporting engagement with the foot 163 of the frame, as shown in full lines, FIG. 7.

The lever 284 is formed of sheet metal and includes a central panel having downturned side flanges 290, the ends of which project beyond the panel to form the arms 282, 283 at one end and lugs 291, 292 at the opposite end thereof, which lugs are pivoted on a pin 293 supported in openings through the side walls 261, 262. A screw 294 is threaded through the panel of the lever 284 and the inner end rests on a sheet metal arm 295 which comprises a panel having upturned side flanges having a pair of lugs 296 at the ends thereof through which the pin 293 extends and about which the arm pivots. The arm 295 has a downwardly extending tongue 297 which rides on a cam 298 attached to an adjusting shaft 300 pivotally supported in openings in the opposite side walls 261, 262 of the frame 141. The lever 284 is urged toward the arm 295 by a tension spring 301 attached at one end to a tab 302 on the lever and attached at the other end to a lug 303 on the frame wall 261. By this arrangement, the lever 284 follows movement of the arm 295 which is swung in one direction or the other about the pivot pin 293 as the cam 298 is rotated by the shaft 300, which movement causes the plunger 157 to effect a change in volume of liquid in the chamber 144 of the unit 140. It will be understood that the load or pressure applied to the liquid in the thermostatic system comprising the element 115 and the unit 140 by the lever 134 pressing on the plunger 133 is less than the load applied by the lever 284 and spring 301 to the plunger 157 so that the plunger 157 is effective to force liquid from the chamber 144 into the recess 124 of the thermal element 115.

The cam 298 may be formed of a suitable molded material and is suitably secured to the shaft by a cross pin, not shown. The shaft 300 is urged toward the frame wall 261 by a bow spring 305 reacting against the frame wall 262 and a shoulder on the shaft formed by a reduced diameter portion of the shaft which extends through an opening in the spring and into a journal opening in the frame wall.

In the form shown, a face plate 306 is suitably attached to the frame 141 and has indicia thereon which cooperates with the pointer type handle in knob 18 to indicate the temperature setting. The knob 18 is suitably secured to the shaft 300 by a set screw or other convenient means, not shown.

It will be apparent that by my invention a control valve mechanism has been provided which is not appreciably affected in its operation by the liquid pressures in the tempering system, which may vary considerably with different systems and in different parts of a given system. The valve mechanism can be adjusted at a point remote from the valve, and the installation of the adjusting device can be effected economically and requires no particular care or skill in handling to avoid damage to parts.

While but one form of the invention has been shown and described in detail, it will be understood that other forms, modifications and adaptations could be made, all falling within the scope of the claims which follow.

I claim:

1. In a heating and cooling system having a source of heated and cooled liquid, a heat exchanger, and means for circulating heated and cooled liquid to said exchanger, a valve body having a chamber therein, said chamber having an inlet passage and first and second outlet passages, means adapted to connect said inlet passage with said liquid source, means adapted to connect said first outlet passage with said heat exchanger, means adapted to connect said second outlet passage with said source of liquid for returning liquid thereto, first and second valve seats in said first and second outlet passages, respectively, two valve closure members downstream of the respective valve seats and adapted to move to and from the respective valve seats, link means interconnecting said valve members and adapted to cause one valve member to move from the valve seat closed thereby as the other valve member is moved toward the valve seat adapted to be closed thereby and vice versa, movable wall means extending transversely of said second outlet passage downstream from said second valve seat, means connecting said wall with said valve closure members whereby fluid pressure differential on opposite sides of said wall urges said wall in a direction to tend to urge said first valve closure member toward said first valve seat, and means for bypassing liquid passed through said second valve seat around said wall.

2. A heating and cooling system as defined in claim 1 further characterized by said movable wall having an area at least equal to the area of the opening through said first valve seat.

3. A heating and cooling system as defined in claim 1 in which the last mentioned means comprises one or more openings through said movable wall.

4. A heating and cooling system as defined in claim 3 in which the area of said opening or openings is less than the effective area of the opening through said second valve seat.

5. A control mechanism having a power element comprising means forming a first chamber having a movable wall, an actuator externally of said chamber and movable by said wall, a liquid contained in said chamber adapted to change in volume for moving said movable wall, means for varying the volume of liquid in said chamber comprising a frame, means forming a second chamber adapted to be supported on said frame and having a shiftable wall, a plunger externally of said second chamber and having an end adapted to engage said shiftable wall for moving said shiftable wall, in response to axial movements of said plunger, means on said frame for supporting said plunger for swinging said end of said plunger into and out of alignment with said shiftable wall and for moving said plunger axially when said plunger is aligned with said movable wall, means associated with said second chamber to guide said plunger into engagement with said shiftable wall, a flexible tube interconnecting the interiors of said chambers, said tube and second chamber containing liquid common to said liquid in said first chamber, and means for detachably securing said means forming said second chamber on said frame in operative association with said member and comprising a support member having spaced shoulders, and said second chamber forming means having a necked portion adapted to be slidingly received between said shoulders.

6. A control mechanism as defined in claim 5 having manually adjustable means to shift said adjusting member relative to said shiftable wall.

7. An adjusting mechanism comprising a body having a chamber therein, one wall of said chamber being movable to vary the volume of said chamber, a tube connected to said body and communicating with said chamber, a liquid filling said chamber and tube, a frame, a lever pivotally supported on said frame, manually operable means to shift the position of said lever about its pivot, a plunger pivotally attached to said lever and having a free end extending from said lever, means to support said plunger in engagement with said one wall, a pair of spaced shoulders on said frame, said body having a neck formation adapted to rest on said shoulders, and means for retaining said neck formation between said shoulders.

8. An adjusting mechanism according to claim 7 in which the last named means comprises laterally projecting shoulders and a spring between said spaced shoulders and said laterally projecting shoulders operative to urge body in a direction to engage said laterally extending projections of said body with said shoulders.

References Cited

UNITED STATES PATENTS

| | | |
|---|---|---|
| 2,447,560 | 8/1948 | Branson. |
| 2,534,251 | 12/1950 | Dillman. |
| 2,558,937 | 7/1951 | Dillman. |
| 2,960,269 | 11/1960 | McGrath. |

EDWARD J. MICHAEL, *Primary Examiner.*

U.S. Cl. X.R.

236—99